United States Patent [19]

Smith

[11] Patent Number: 4,936,513

[45] Date of Patent: Jun. 26, 1990

[54] BALL MILLS

[75] Inventor: Clay D. Smith, Syracuse, N.Y.

[73] Assignee: Otisca Industries, Ltd., Syracuse, N.Y.

[21] Appl. No.: 139,649

[22] Filed: Dec. 30, 1987

[51] Int. Cl.[5] .......... G02C 17/16

[52] U.S. Cl. .......... 241/24; 241/69; 241/171; 241/172; 241/177

[58] Field of Search .......... 241/46, 17, 176–179, 241/171, 172, 184, 30, 69, 24

[56] References Cited

U.S. PATENT DOCUMENTS

| | | | |
|---|---|---|---|
| Re. 12,778 | 4/1908 | Bonvillain . | |
| 810,904 | 1/1906 | Bonvillain . | |
| 927,516 | 7/1909 | Emerick . | |
| 1,517,538 | 12/1924 | Daman . | |
| 1,772,737 | 8/1930 | Wise et al. . | |
| 2,755,502 | 7/1956 | Herr . | |
| 2,991,947 | 7/1961 | Schuyler . | |
| 3,015,451 | 1/1962 | Goeser . | |
| 3,075,710 | 1/1963 | Feld et al. . | |
| 3,160,395 | 12/1964 | Reising . | |
| 3,486,705 | 12/1969 | Szegvari | 241/172 |
| 3,545,687 | 12/1964 | Mosby . | |
| 3,814,334 | 6/1974 | Funk | 241/172 X |
| 4,054,292 | 10/1977 | Stone . | |
| 4,129,261 | 12/1978 | Engels et al. | 241/172 X |
| 4,624,418 | 11/1986 | Szkaradek . | |
| 4,651,935 | 3/1987 | Samosky et al. . | |
| 4,730,789 | 3/1988 | Geiger | 241/172 X |

FOREIGN PATENT DOCUMENTS

| | | | |
|---|---|---|---|
| 1175016 | 7/1964 | Fed. Rep. of Germany . | |
| 1254000 | 11/1967 | Fed. Rep. of Germany | 241/172 |
| 2154059 | 5/1973 | Fed. Rep. of Germany . | |
| 576368 | 4/1924 | France | 241/176 |
| 304791 | 5/1983 | U.S.S.R. . | |

OTHER PUBLICATIONS

Ultra Centrifugal Mill, Glen Mills Inc., 203 Brookdale St., Maywood, NJ 07607.

Cage–Paktor, T.J. Gundlach Machine Company, P. O. Box 385, Belleville, IL 62222.

*Primary Examiner*—Mark Rosenbaum

*Attorney, Agent, or Firm*—Hughes & Multer

[57] ABSTRACT

Stirred ball mills which have a casing that houses serially related sets of elongated, longitudinally extending stirring elements. The elements of each set are supported in a concentric array about and from a rotatable shaft. Complementary arrays of stirring elements may be supported from the casing, and it and the shaft can be rotated in opposite directions to optimize the stirring of the grinding balls in the mill. Also, concentric arrays of stirring elements may be assembled to the shaft or the shaft and the casing for this purpose. The stirring rods also cause the grinding balls to scour and thereby prevent plugging of a screen located at the discharge end of the mill to keep the grinding balls from escaping. The mill can be tilted in a manner that results in the grinding balls being uniformly distributed along the length of the casing.

25 Claims, 6 Drawing Sheets

BALL MILLS

TECHNICAL FIELD OF THE INVENTION

The present invention relates to ball mills and, more particularly, to novel, improved, stirred ball mills for efficiently grinding particulate solids to an extremely small size.

Coal in an aqueous slurry is one material that has been successfully ground to a small top size in accord with the principles of the present invention. In the interest of clarity and for the sake of convenience, the principles of the present invention will be developed primarily by relating them to that application of the invention. This is not intended, however, to limit the scope of protection as defined in the appended claims.

BACKGROUND OF THE INVENTION

Finely ground coals in aqueous suspension are viable alternates for stoker coal, pulverized coal, No. 6 fuel oil, petroleum-based fuels, and natural gas. State-of-the art slurries of that character are described in U.S. patent application No. 406,730 filed June 10, 1982, and assigned to the assignee of the inventions described and claimed herein (now U.S. Pat. No. 4,515,602 dated May 7, 1985). Those coal-water slurries have a particle size distribution of at least 95% 30 m×0. The stirred ball mills disclosed and claimed herein are capable of wet grinding the solid particles in slurries containing up to 65 weight percent solids (or an even higher concentration of solids) to a size consist of that character at an acceptable operating cost and with an also acceptable capital investment.

SUMMARY OF THE INVENTION

Like other stirred ball mills, those disclosed and claimed herein include a casing or container housing elements which move in a circular path to stir milling or grinding balls disposed in the container. Solids introduced into the upstream end of the mill are reduced in size as they migrate therethrough by compression and shear forces attributable to the interaction between the stirred balls and the particles being comminuted.

It is not considered necessary to describe wet, stirred ball mill grinding further herein as this basic technique has been in common usage for many years. Details on this grinding technique are available from, for example, Perry and Green, PERRY'S CHEMICAL ENGINEERS' HANDBOOK, Sixth Edition, McGraw-Hill Book Company, New York, N.Y., 1984, pp. 8-34 and 8-35.

Needless to say, however, the stirred ball mills disclosed herein have a number of features which clearly distinguish them from those on which information has heretofore been available.

One of these novel features is the mechanism by which the balls in the barrel or container of the mill are stirred. This takes the form of a shaft concentrically housed in the circular barrel of the mill; circular, disc-like supports spaced along and rotatable with the shaft; and rods extending between and fixed to adjacent discs and near the peripheries of and at intervals therearound. These rods can be fabricated from: an appropriate metal, an abrasion resistant ceramic, or a metal coated with a ceramic of that character.

The stirring rod arrangement produces the desired attrition of the solids processed through the mill by: (1) minimizing quiescent zones in which the grinding media is not circulated into contact with the solids being processed, and (2) maximizing the volume of the zone where shear and impact energy are high enough to cause size reduction with a minimum of wear, thereby maximizing the efficiency of the grinding operation and reducing wear of the mill components.

Milling apparatus which, at first glance, seems to resemble that just described is disclosed in U.S. Pat. No. 3,545,687 issued Dec. 8, 1970, to Mosby for MEDIA MILL. Only a limited further analysis, however, demonstrates that there is in fact little resemblance between the mill disclosed by Mosby and those disclosed herein. For example, the rods of the Mosby apparatus, extending as they do from end to end of the mill disclosed therein, and being fabricated from an unspecified material, are certainly not comparable to the abrasion and wear resistant, support disc-to-support disc extending rods utilized in the mills described herein to efficiently generate solids of an extremely small size consist.

Similar, but even less practical, ball mills with rods for stirring the grinding media are disclosed in U.S. Pat. No. 3,015,451 issued Jan. 2, 1962, to Goeser for BALL MILL and in German application No. 1175061 laid open July 30, 1964, and entitled KUGELMÜHLE MIT MITNEHMERSTÄBEN. The stirring rods of the foregoing mills, supported as they are only at their ends, would be totally impractical in a mill of any significant capacity designed for applicant's or comparable purposes.

Yet even less relevant is German patent application No. 2154059 which was laid open on May 3, 1973, and is entitled RUHRWERKSMÜHLE ZUM FEINSTMAHLEN UND HOMOGENISIEREN VON KAKAOMASSE. That application is concerned solely with a vertical mill and discloses an arrangement of stirring rods which would appear to be useful only in that type of mill. Furthermore, the rods are oriented in a manner which would cause the grinding media to be propelled toward the barrel of the mill. This arrangement thereby causes unnecessary wear and promotes unwanted channeling.

Furthermore, concentric sets of rods are preferably employed in the novel ball mills disclosed herein to promote efficient grinding by providing better stirring of the grinding media. That concentric sets of stirring rods will promote efficient grinding is a finding that is not recognized in any of the prior art references identified and discussed above.

Another novel and important approach to grinding in a stirred ball mill disclosed herein involves the use of both rotor- and casing-supported rods and counterrotation of the rotor and casing to promote grinding efficiency by more effectively stirring the grinding media. Cantilevered mounting of the casing and rotor associated stirring rods can be employed in such mills so that the above-discussed concentric set of stirring rods and the advantages obtainable by using multiple sets of stirring rods can simultaneously be realized.

Yet another feature of the present invention is a novel screening arrangement at the discharge end of the mill. This system keeps the balls or other grinding media from passing out of the mill barrel or container with the comminuted solids.

Screens at the discharge end of a horizontal ball mill are not per se unique as is shown by U.S. Pat. No. 3,160,395 issued Dec. 8, 1964, to Reising for MATERIAL PROCESSING DEVICE and by Russian patent publication No. 396,353. The novel stirred ball mills disclosed herein are different from and superior to those described in the foregoing references, however, in that the discharge screen is continuously scoured by grinding media circulated into contact with that screen to keep the comminuted solids from plugging the discharge screen.

A further important feature of the novel grinding mills disclosed herein is a support system which allows the outlet of the mill to be raised above its inlet to a degree which results in the grinding media being uniformly distributed over the length of the mill during the grinding operation. This has two beneficial effects: wear of the mill is equalized, and that area toward the inlet end of the mill is more effectively employed for grinding.

Tilted ball mills are disclosed in U.S. Pat. Re. Nos. 12,778 issued Apr. 7, 1908, to Bonvillain for APPARATUS FOR GRINDING OR CRUSHING FOUNDRY SAND and 927,516 issued July 13, 1909, to Emerick for TUBE MILL; and such mills in which the angle of inclination can be changed are disclosed in U.S. Pat. Nos. 1,772,737 issued Aug. 12, 1930, to Wise for BALL MILL and 2,991,947 issued July 11, 1961, to Schulyer for GARBAGE EMUSIFIER AND DISPOSAL. In none of these references, however, is there any suggestion of the criteria that must be met in tilting the mill to promote efficient grinding at its inlet end and to equalize wear of the mill.

OBJECTS OF THE INVENTION

From the foregoing, it will be apparent to the reader that one primary object of the invention resides in the provision of novel, improved, stirred ball mills for grinding solids to a specified size consist.

Other, more specific, but nonetheless important, objects of the invention reside in the provision of such ball mills:

which are capable of producing comminuted solids in which the differential in particle size is smaller than in the solids produced by conventional stirred ball mills with stationary casings;

which have a rotatable shaft and employ serially arranged circular arrays of longitudinally extending, shaft-supported rods to stir the grinding media;

in which, in conjunction with the preceding object, plural, concentric sets of stirring rods are employed to promote stirring of the grinding media and consequent efficiency in the grinding process;

which employ counterrotating, complementary sets of stirring rods to promote grinding efficiency;

in which, in conjunction with the preceding object, concentric, intermeshing sets of shaft and casing mounted stirring rods are employed to further promote the grinding efficiency of the mill;

which employ a screen at the discharge end of the mill to retain the grinding media therein and utilize scouring of that screen with media moved across it by stirring rods to keep the screen from being plugged with the material undergoing comminution;

which have a support system that allows the mill to be tilted in a manner promoting even wear and more efficient grinding at the inlet end of the mill.

Still other important objects and features and additional advantages of the invention will be apparent to those skilled in the relevant arts from the foregoing and the appended claims and as the ensuing detailed description and discussion proceeds in conjunction with the accompanying drawing.

DETAILED DESCRIPTION OF THE INVENTION

Figure 1:
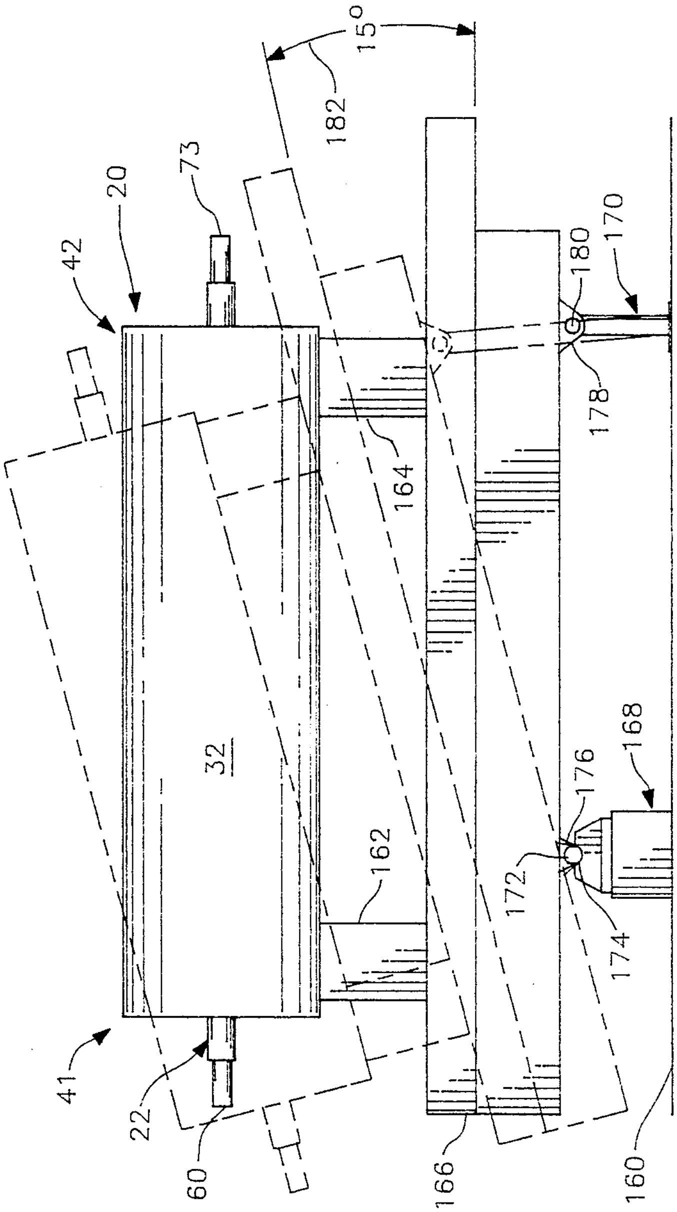
FIG. 1 is a side view of a stirred ball mill embodying the principles of the present invention, the mill being shown: (1) in a horizontal (zero tilt) position in solid lines, and (2) tilted to distribute grinding balls charged into the mill evenly along its length in dotted lines.
Figure 2:
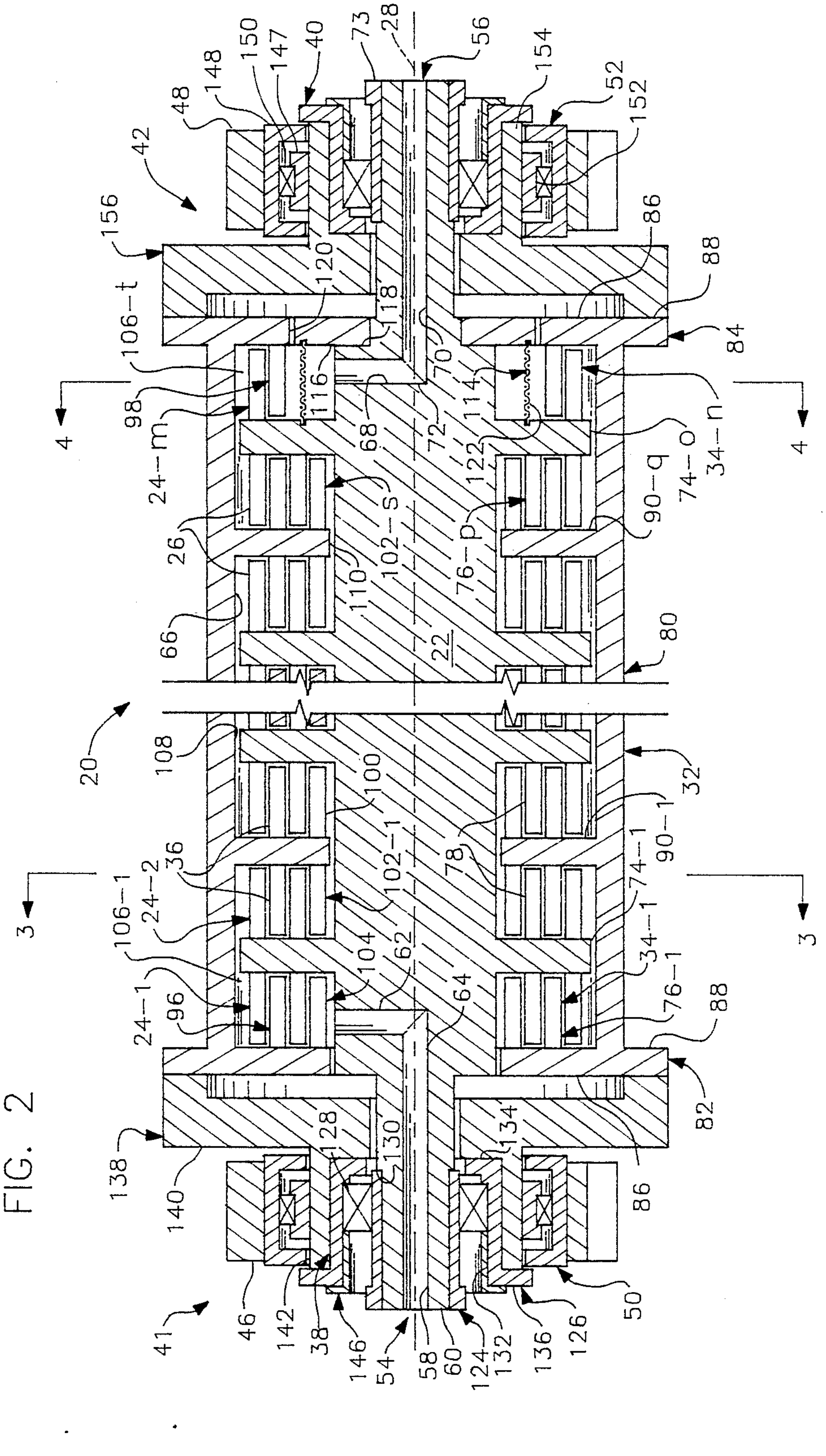
FIG. 2 is a longitudinal section through the mill.

Referring now to the drawing, FIGS. 1 and 2 depict a stirred ball mill 20 constructed in accord with, and embodying, the principles of the present invention.

Among the major components of ball mill 20 is a shaft 22 which carries serially related sets 24-1–24-m of stirring rods 26. These rods parallel the axis of rotation 28 of shaft 22. Rods 26 stir the grinding balls 30 charged into mill 20 (see FIG. 5), thereby promoting moving contact between those balls and the material being comminuted to increase the efficiency of the comminution process.

Shaft 22 and the stirring rods 26 supported from that shaft are housed in an elongated, cylindrical casing or shell 32.

Complementary sets 34-1–34-n of stirring rods 36 are supported from casing 32. Stirring rods 36 cooperate with rods 26 to promote the stirring of grinding balls 30 and contribute significantly to the efficiency of mill 20.

Stirring efficiency is preferably further promoted by rotating shaft 22 and casing 32 in opposite directions about axis of rotation 28. To this end, shaft 22 is rotatably supported from casing 32 in inner bearings 38 and 40 at the inlet and outlet (or discharge) ends 41 and 42 of mill 20; and the casing is rotatably supported in pillow blocks 46 and 48 at these respective ends of mill 20 by outer bearings 50 and 52.

Figure 6:
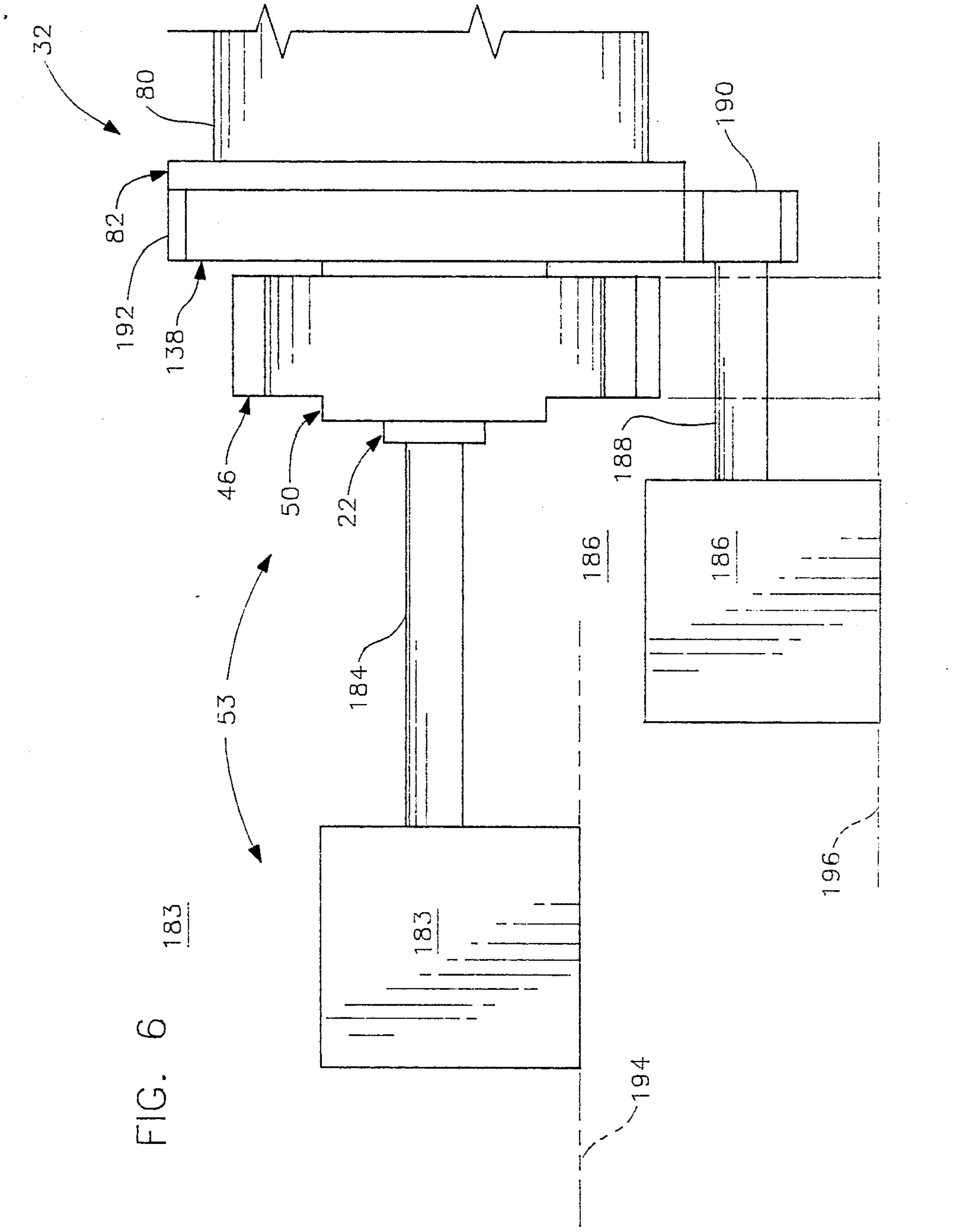
FIG. 6 is a generally pictorial view of a drive system for rotating an internal shaft and an outer casing of the stirred ball mill shown in FIGS. 1-5.

The shaft 22 and casing 32 are rotated in opposite directions about axis 28 in bearings 36, 38 and 50, 52 by a drive system depicted diagrammatically in FIG. 6 and identified by reference character 53.

Referring now primarily to FIGS. 1–4, shaft 22 is an elongated, circularly sectioned component of monolithic construction. An inlet passage 54 for a slurry of the material to be ground is formed in shaft 22 at the upstream end 41 of mill 20, and a discharge passage 56 is formed in the shaft at the downstream end 42 of the mill. Inlet passage 54 has a longitudinally extending segment 58 opening onto the outer end 60 of shaft 22 and a radial segment 62 extending from the inner end 64 of inlet passage segment 58 to the annular space 66 between shaft 22 and casing 32. Discharge passage 56 is of similar configuration; it includes a radial, inwardly extending segment 68 and a longitudinal segment 70. The latter extends from the inner end 72 of radial segment 68 to, and opens onto, the downstream, external end 73 of shaft 22.

Figure 3:
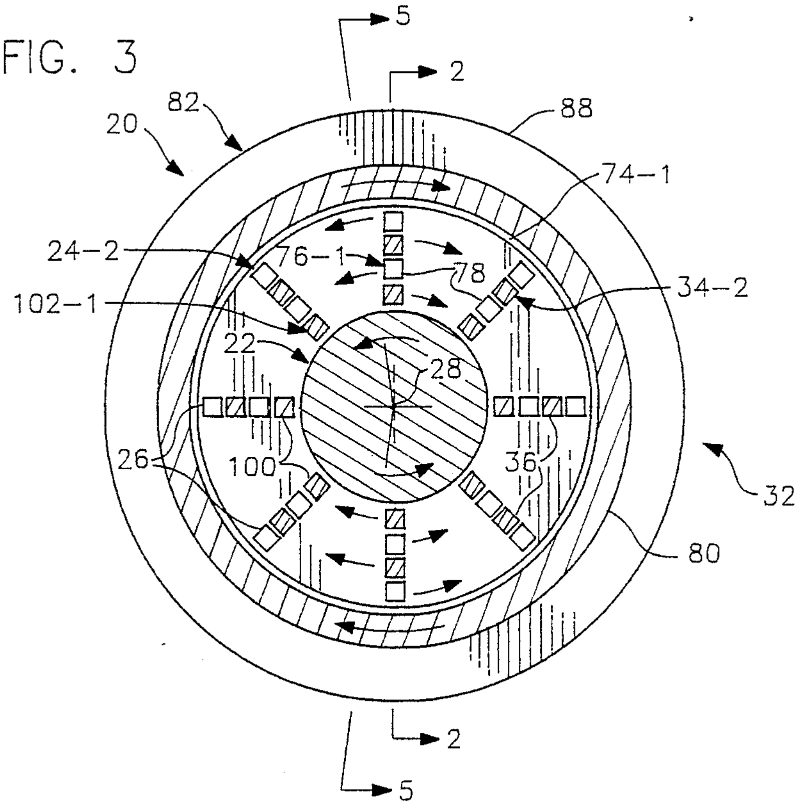
FIG. 3 is a section through the mill taken substantially along line 3—3 of FIG. 2.

Integral, also circularly sectioned, stirring element supports 74-1–74-o are spaced at intervals along shaft 22. Two sets 24 of stirring rods 26 are fixed in any convenient manner to, and supported in cantilever fashion by, each of these supports 74. As is best shown in FIG. 3, the rods 26 in each set are arranged in a circular array which is concentric with the axis of rotation 28 of shaft 22, and the rods 26 in each set extend parallel to axis 28. The rods 26 in one of the two sets 24 attached to each circular support 74 extend from that support toward the upstream or inlet end 41 of mill 20. The rods 26 in the companion set extend from the same support 74 toward the downstream or discharge end 42 of the mill.

Figure 4:
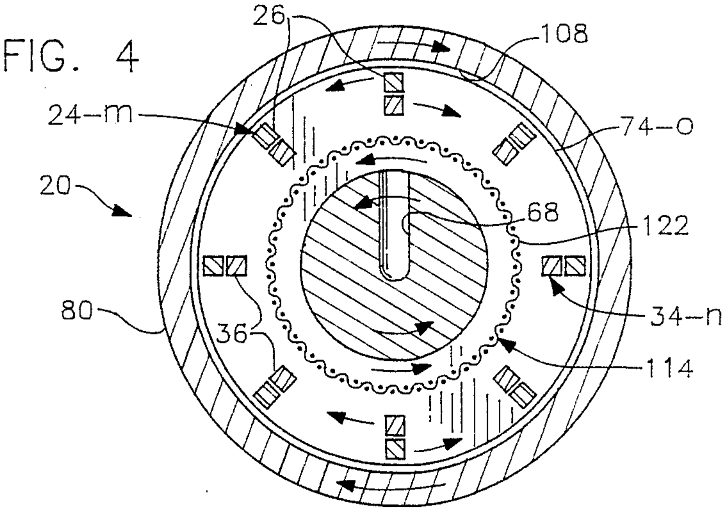
FIG. 4 is a section through the mill taken substantially along line 4—4 of FIG. 2.

Referring now specifically to FIGS. 1–3, each set 24 of shaft-supported stirring rods 26 is preferably complemented by a second, inner, concentric set 76-1–76-p of longitudinally extending, cantilevered stirring rods 78 except at the discharge end of mill 20 where the last set 24-m of rods 26 is located (see FIG. 4). Rods 78 provide additional stirring of grinding balls 30, thereagain increasing the grinding efficiency of mill 20.

It will of course be appreciated, in conjunction with the foregoing, that more than two concentric sets of shaft-supported stirring rods may be employed, if desired, to promote the stirring of the grinding balls in a stirred ball mill employing the principles of the present invention.

Referring now specifically to FIG. 2, but also to FIGS. 3 and 4, the casing 32 of stirred ball mill 20 has a cylindrical, circularly sectioned, central section 80 and integral end walls or sections 82 and 84. Each of the end sections has one segment 86 which extends inwardly from the central section 80 of casing 32 towards shaft 22 and a second segment 88 which extends outwardly from the casing central section.

Spaced along casing central section 80 and located approximately midway between adjacent, shaft-integrated stirring rod supports 74-1–74-o are radially inwardly extending, disclike, integral, casing associated, stirring rod supports 90-1–90-q. Two sets 34 of the casing-supported stirring rods 36 are fixed in any convenient manner, and in cantilever fashion, to each of these casing-associated supports 90. As is the case with shaft-supported stirring rods 78, those cantilevered rods 36 in one set are assembled into a circular array with the rods paralleling the axis of rotation 28 of shaft 22 and extending from the support toward the upstream end 41 of mill 20. The cantilevered rods 36 in the second set associated with the same support 90 extend from that support parallel to, and toward, the downstream end 42 of mill 20.

Similar arrays 96 and 98 of stirring rods 36 are cantilevered from the inner segments 86 of casing end sections 82 and 84.

As is best shown in FIGS. 2 and 3, stirring rods 100 of the character described above are fixed to casing-associated stirring rod supports 90-1–90-q in spaced, concentric relationship to casing-supported stirring rods 36. Stirring rods 100 are arranged in circular sets or arrays 102-1–102-s. And a similar array 104 of rods 100 is fixed to the inner segment 86 of upstream casing end section 82.

Thus, as is best shown in FIGS. 2 and 3, shaft-supported stirring rods (26 and 78) are alternated with casing-supported stirring rods 36 and 100 (looking in a radial direction). This arrangement cf multiple, alternately shaft- and casing-supported stirring rods is preferred for its effectiveness in stirring grinding balls 30 and consequently promoting the grinding efficiency of mill 20. Furthermore, this novel arrangement of stirring elements has the advantage of minimizing wear of the stirring elements. It also promotes efficiency by minimizing the volumes in the mill in which no grinding takes place.

The sets of shaft- and casing-supported stirring rods employed in a mill with a counterrotating shaft and casing may be equal in number. Or the number of sets of shaft-supported rods may be greater, or smaller, than the number of sets of casing-supported rods. Unequal numbers of casing- and shaft-supported stirring rod sets may be employed, as one example, to balance the power required to rotate shaft 22 and casing 32.

While the stirring rods employed in the illustrated, exemplary mill 20 have a square cross-section, this is not required. In fact, stirring rods with airfoil, circular, or other cross-sectional configurations may produce better results, depending upon the requirements imposed by any particular application of my invention.

Also, it is by no means critical that the illustrated, uniformly distributed (or equiangularly spaced) patterns of stirring rods be employed. Instead, the best results may be obtained–again depending upon the application of the invention–by using a non-uniform, or even random, pattern in spacing the rods.

As is best shown in FIG. 1, shaft 22, casing 32, shaft-associated stirring rod supports 74-1–74-o, and casing-associated stirring rods supports 90-1–90-q cooperate to define a series of grinding compartments 106-1–106-t. Grinding compartments 106 alternately communicate with the succeeding compartment through: (a) annular passages 108 between casing central section 80 and shaft-associated stirring rod supports 74, and (b) annular passages 110 between casing-associated stirring rod supports 90 and shaft 22.

The several compartments 106 combine to define a grinding circuit between inlet passage 54 and discharge passage 56 for the solids being comminuted in mill 20. This grinding circuit is identified by arrowheads 112 in FIG. 5. As shown in that Figure, the solids being comminuted in mill 20 flow through passage 54 in shaft 22 radially outward into compartment 106-1, then through the passage 108 between shaft-associated support 74-1 and casing center section 80 into grinding compartment 106-2, next through the passage 110 between casing-associated stirring rod support 90-1 and shaft 22 into grinding compartment 106-3, etc. until the discharge passage 56 for the comminuted solids is reached.

Figure 5:
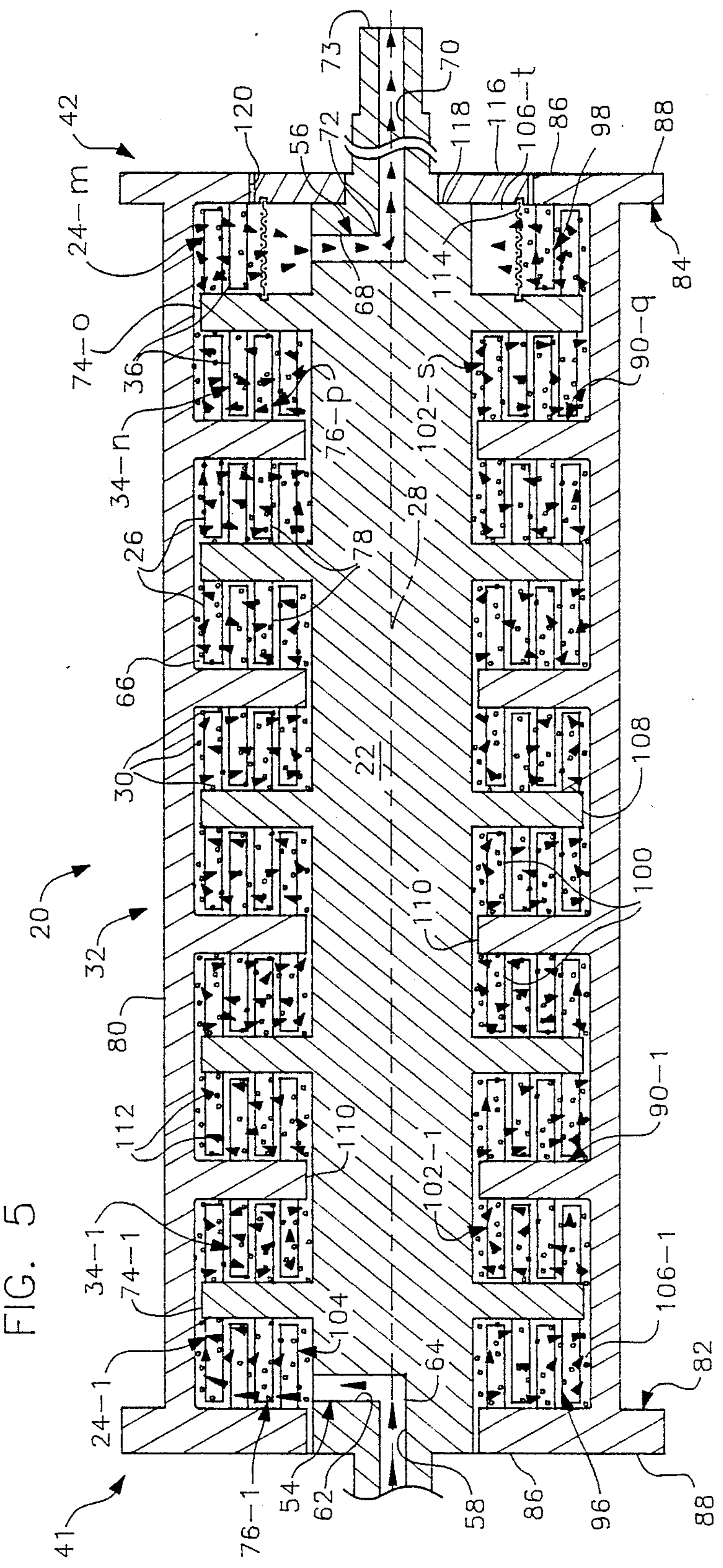
FIG. 5 is a view similar to FIG. 2 of the stirred ball mill illustrated in FIG. 1; this figure depicts the flow of the solids being processed through the mill; i.e., the grinding circuit.

As is shown in FIGS. 2, 4, and 5, a cylindrical screen 114 surrounds stirring rod-supporting shaft 22 in the last of the just-described grinding compartments 106-t. This screen isolates the discharge passage 56 for the comminuted solids from grinding circuit 112, thereby keeping grinding balls 30 from being discharged from mill 20 with the comminuted solids.

At one end, screen 114 is supported in concentric relationship with shaft 22 from the casing-associated stirring rod support 74-o nearest the discharge end 42 of mill 20. The other end of screen 114 is supported from a circular, disclike closure member 116. Closure member 116 is journaled on and butted against a shoulder 118 on shaft 22; and it fits within a circular opening 120 in casing end member 84, cooperating with the latter to keep solids from escaping from casing 32 at the discharge end 42 of mill 20. By virtue of the mounting arrangement just described, screen 114 is supported from shaft 22 for rotation therewith.

As is shown in FIGS. 2, 4, and 5, one set cf shaft-associated stirring rods 26 and one set of casing-associated stirring rods 36 are located in the same grinding compartment 106-t as screen 114. These concentrically related, counterrevolving sets of stirring rods 26 and 36 cause the grinding balls 30 in compartment 106-t to scour the outer surface 122 of discharge screen 114. This keeps the openings through screen 114 from being plugged, thereby making a significant contribution to the successful operation of mill 20.

Turning now to specifically FIG. 2, I pointed out above that shaft 22 is rotatably supported in casing 32 by bearings 38 and 40 at the upstream and downstream ends 41 and 42 of mill 20 and that the casing is in turn rotatably supported in pillow blocks 46 and 48 by bearings 50 and 52 respectively located at the upstream and downstream ends of the mill.

As shaft-supporting bearings 38 and 40 are virtually identical, only the former will be described in detail herein. Bearing 38 (see FIG. 2) has an inner race 124 and an outer race 126, both of ringlike configuration and separated by bearing elements 128 such as rollers or balls.

Inner race 124 of bearing 38 is fitted on the upstream end of shaft 22 with its inner end abutting a shoulder 130 on that shaft.

The outer race 126 of bearing 38 has a cylindrical center section 132; a radial inwardly extending section 134; and an also radial, but outwardly extending, section 136. Outer race 126 is fitted in a bearing support 138 which has a disclike section 140 fixed to the upstream end section 82 of ball mill casing 32. Bearing support 138 also has an integral, cylindrical section 142 which extends longitudinally from support section 140 toward the upstream end 41 of mill 22. The outer race 126 of bearing 38 is fitted in bearing support section 142 with the inner, radial section 134 of race 126 butting against the disclike section 140 of support 138 and the outer, radial section 136 of the race abutting the upstream end of the cylindrical, race supporting section 142 of bearing support 138.

Bearing elements 128 are retained in place by a cylindrical, flanged keeper 146 which extends into outer race central section 132 and is fastened to the latter in any convenient fashion, for example by cooperating threads in the outer race and on keeper 146.

The outer, casing supporting bearings 50 and 52 are, like their counterparts—shaft supporting bearings 38 and 40—virtually identical. In this case, therefore, only the downstream, casing supporting 20 bearing 52 will be described.

Referring still to FIG. 2, then, the bearing 52 which rotatably supports casing 32 from pillow block 48 includes an inner race 147 and an outer race 148 separated by bearing elements 150 such as rollers or balls.

Inner race 147 of bearing 52 is a cylindrical member with a seat 152 for bearing elements 150. That race is seated on the integral, cylindrical section 154 of downstream bearing support 156.

The outer race 148 of casing supporting bearing 52 is seated in downstream pillow block 48. Thus, pillow block 48 supports the downstream end 42 of mill 20 through bearing 52 and the bearing support 156 fixed to the downstream end section 84 of the mill's casing 32.

Referring again to FIG. 1, the mill 20 just described is supported from a floor or other base (identified generally in FIG. 1 by reference character 160) by an arrangement which includes: (a) supports 162 and 164 for the upstream and downstream pillow blocks 46 and 48 of the mill; (b) a platform 166 on which supports 162 and 164 are mounted; (c) stanchions 168 toward the upstream end 41 of the mill (only one of which is shown) for supporting platform 166 from base 160; and (d) screw jacks 170 (again only one of which is shown) which support the downstream end of platform 166 from base 160.

The upstream end of platform 166 is connected to vertical stanchions 168 for rotational or tilting movement about a transverse, horizontal axis 172 by a pivot member 174. This member is attached to the lower side of platform 166 as by the diagrammatically illustrated bracket assembly 176.

A similar bracket assembly 178 and a pin 180 connect the upper end of each screw jack 170 to the downstream end of platform 166. Consequently, by extending and retracting the screws (not shown) of jacks 170, platform 166 and mill 20 can be tilted about axis 172 as indicated by double-ended arrow 182 between one limit position (shown in solid lines) in which mill 20 is horizontal and a second limit position (shown in phantom lines) in which the mill is tilted at an angle—typically a maximum of 15°—with the discharge end 42 of the mill elevated above the inlet end 41. The extension and retraction of the screws of the two jacks 170 is preferably coordinated—by driving them from a common input, for example—so that mill 20 will remain in registration and not rock about its axis as its discharge end is raised and lowered.

That mill 20 can thus be operated at different angles of tilt is a significant feature of my invention. In particular, it has been found that the grinding balls 30 with which mill 20 is charged have a pseudo angle of repose during the operation of mill 20 and that this angle varies with such factors as the size of grinding balls 30, the consistency of the charge in mill 20, the throughput rate of the solids being comminuted, and similar factors. Because of this pseudo angle of repose, the grinding balls 30 may tend to collect and stack up in the discharge end 42 of mill 20 during operation of the mill if it is operated in a horizontal orientation. This is undesirable. First, because there are fewer balls toward the upstream end 41 of mill 20, grinding efficiency suffers in the initial grinding compartments 106-1 . . . . Second, if the grinding balls 30 are unevenly distributed, internal components of mill 20—particularly stirring rods 26, 36, 78, and 100—will wear faster in those compartments 106 toward the discharge end 42 of mill 20 where the concentration of grinding balls 30 is greater. This is undesirable because of the considerable expense and downtime appurtentant to the replacement of internal mill components, even if time saving maintenance features such as a split outer casing are employed.

As suggested above, one of the important parameters that has to be taken into account to obtain a uniform distribution of grinding balls 30 along the length of mill 20 is the throughput rate of the solids being comminuted. Specifically, it has been found that the pseudo angle of repose of grinding balls 30 and, therefore, the angle to which mill 20 must be tilted to effect a uniform distribution of those balls along the length of the mill is dependent upon the throughput rate of the solids being comminuted. The screws of jacks 170 can be extended and retracted, as necessary, to ensure that the angle of inclination of mill 20 is greater than the psuedo angle of repose of grinding balls 30 and that the grinding balls accordingly do not pile up in the discharge end 42 of mill 20. It is important, in this respect, that the mill not be tilted more than is necessary to overcome that tendency of grinding balls 30 to collect in the discharge end 42 of mill 20. Excessive tilting is counterproductive as it causes the grinding media to migrate toward, and collect to an excessive extent in, the upstream end 41 of the mill.

Thus, in one series of tests involving a stirred ball mill as disclosed herein and illustrated in FIGS. 1–4, a 4000 pound charge of grinding balls, and various throughput rates, a tilt angle of eight and one-half degrees proved to be optimum for throughput rates bordering on 7 tons per hour. At higher angles, the grinding balls jammed the inlet to the mill; and power consumption increased dramatically. Similarily, at significantly lower angles of tilt, the grinding media collected to an excessive extent in the discharge end of the mill; and the power consumption was, again, higher.

Referring now to FIG. 6, the drive system 53 for rotating the shaft 22 and casing 32 of mill 20 includes a motor-gearbox unit 183 with an output shaft 184 which is coupled to the rotor or shaft 22 of ball mill 20 to rotate the latter.

A second motor-gearbox unit 186 has an output shaft 188 on which a spur gear 190 is mounted. This gear meshes with an external ring gear 192 which is integral with or fixed to the casing attached pillow block or bearing support 138 at the upstream end 41 of mill 20, completing a drive connection to casing 32 of mill 20.

The two motor-gearbox units 183 and 186 are mounted on the tiltable, mill-supporting platform 166 as is suggested by phantom lines 194 and 196 in FIG. 6.

Units like these identified above by reference characters 183 and 186 and in which the motor and gear drive are housed separately or encased in the same housing are available from a number of sources. For that reason and because the details of drive system 53 are not part of the present invention, that system will not be described further herein.

Minimization of centrifugal forces is one parameter that may be taken into account in selecting the speeds of rotation of shaft 22 and casing 32. By minimizing these forces, one can: reduce wear at the periphery of mill 20; increase the concentration of grinding balls 30 in those regions nearer the center of the mill,; and increase the volume in the mill that is at an optimal shear impact range, thereby grinding the solids being processed in mill 20 with minimal wear. Minimization of the centrifugal forces generated in the operation of mill 20 also reduces the potential for channeling in mill 20. As a result, the mill is capable of producing a ground product which is superior in that the differential between its top and average sizes is substantially smaller than that which can be achieved with a mill having a stationary casing.

As indicated above, maximum grinding efficiency can be obtained by employing multiple sets (or concentric arrays) of: (a) shaft-supported stirring rods such as 26 and 78, and (b) casing-supported stirring rods 36 and 100 and the illustrated, counterrotating shaft 22 and casing 32.

However, it is not in all cases necessary that a mill of this complexity as illustrated in FIGS. 1-5 be employed to enjoy the benefits of my invention discussed above. On the contrary, a simpler mill such as the one depicted in FIG. 7 and identified by reference character 210 can instead be employed to advantage in many, less demanding applications of my invention.

Figure 7:
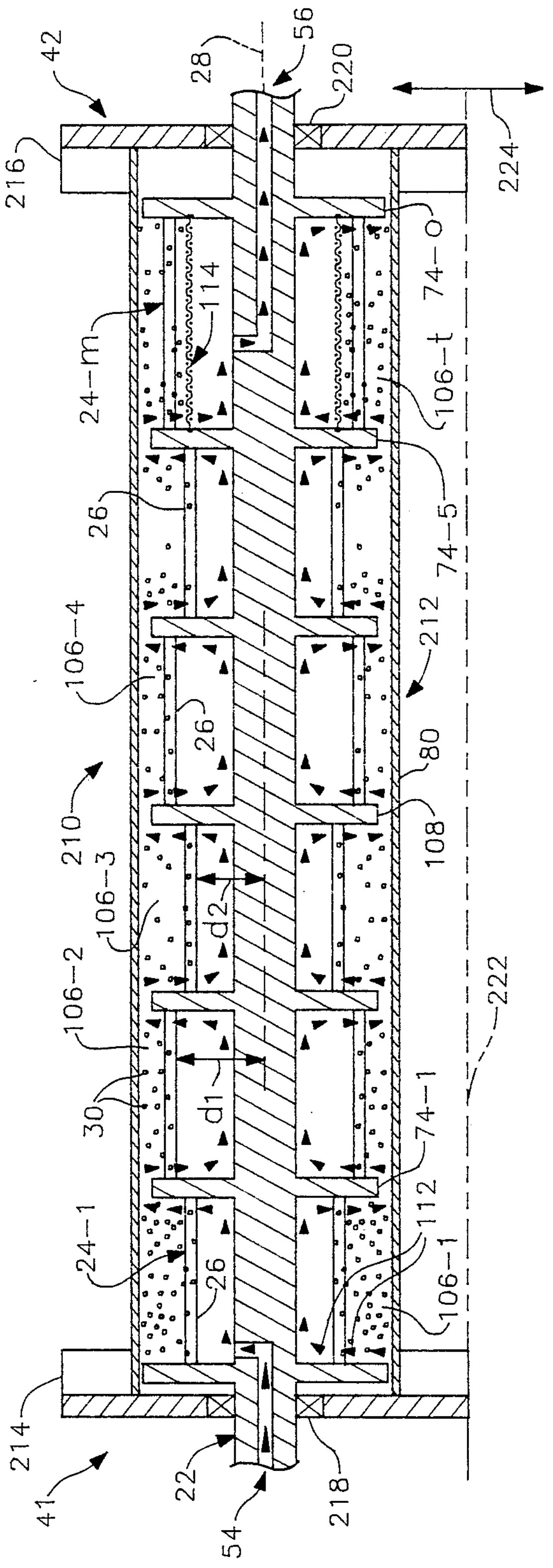
FIG. 7 is a view, similar to FIG. 5, of a second stirred ball mill in which principles of the present invention are also embodied.

Turning then to FIG. 7, mill 210 is in certain respects like mill 20. To the extent that this is true, the same reference characters have been employed.

Like mill 20, mill 210 has a rotatable shaft 22 with integral, radially extending supports 74 and serially arranged sets 24 of longitudinally oriented stirring rods 26 extending between and supported from adjacent shaft-associated supports 74. In the case of mill 210, however, the stirring rods are supported at both ends from the associated supports rather than being cantilevered as the various stirring rods are in mill 20.

Also, mill 210 differs from mill 20 in that the discharge screen 114 employed to retain grinding balls 30 in the mill extends between and is fixed at its opposite ends to the last two shaft-associated stirring rod supports 74-5 and 74-6 rather than extending between a stirring rod support and a closure member as is the case in mill 20.

The primary difference between mills 20 and 210 is, however, that the casing 212 of mill 210 is stationary rather than rotatable; and there are no stirring rods supported from the casing. As will be apparent to the reader from comparing FIGS. 2 and 7, this considerably simplifies the mill. This is not accomplished without cost, however. As shown in FIG. 7, the stationary casing type of mill has the disadvantage that the grinding balls 30 migrate toward, and collect in, the outer regions of casing 212. As a consequence: (1) grinding is less efficient than in a mill with counterrotating shaft and casing because of the low concentration of grinding balls in the inner regions of the mill, and (2) the internal components of the mill nearer the periphery of casing 212 wear more rapidly than components nearer the center of the mill do, thereby increasing maintenance costs. Nevertheless, due primarily to the novel shaft-supported stirring rod arrangement shown in FIG. 7, mill 210 is capable of comminuting solids introduced into it through inlet passage 54 in an efficient and expeditious manner; and maintenance costs may be acceptable in many instances.

In mill 210, shaft 22 is rotatably supported from the end sections 214 and 216 of stationary casing 212 in bearings 218 and 220. The end sections 214 and 216 of stationary casing 212 may be mounted directly on a platform of the type illustrated in FIG. 1 and indicated in FIG. 6 by reference character 222. A platform supporting arrangement of the type shown in FIG. 1 will also preferably be provided so that mill 210 can be tilted as indicated by double headed arrow 224 to produce a uniform distribution of grinding balls 30 along the length of mill 210.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description; and all changes which come within the meaning and range of equivalency of the claims are therefore intended to be embraced therein.

What is claimed is:

1. A stirred ball mill comprising: an elongated, rotatable, casing having a center section and end walls at the opposite ends of and cooperating with said casing center section to form a closed container; an independently rotatable shaft housed in and extending from end-to-end of said container; and means for stirring a mass of grinding balls disposed in said container, said ball stirring means comprising: a first circular array of stirring elements supported from said shaft for rotation therewith and with stirring elements paralleling the axis of rotation of said shaft; a complementary and cooperating circular array of similarly oriented stirring elements supported from said casing for rotation therewith and in concentric relationship to the stirring elements in said first array; and means for rotating only said shaft and said casing and for rotating said shaft and said casing in opposite directions.

2. A stirred ball mill as defined in claim 1 which also includes in concentric relationship, at each end of said casing: a pillow block, a first bearing mounted in said pillow block, means supporting said end of said casing in said first bearing, and a second bearing mounted in said casing support, the end of said shaft at said end of said casing being mounted in said second bearing.

3. A stirred ball mill as defined in claim 1 wherein the means for rotating said shaft and said casing in opposite directions comprises separate drive units for said shaft and for said casing.

4. A stirred ball mill as defined in claim 1 which has means for so controlling the speeds of rotation of said shaft and said casing as to reduce the centrifugal force on the grinding balls in said container and on the solids being processed therein essentially to zero.

5. A stirred ball mill as defined in claim 1 which has means for so controlling the relative rates of rotation of said shaft and said casing as to stir said grinding balls but keep them from rotating at high speed about the axes of rotation of the shaft and casing.

6. A stirred ball mill comprising: an elongated casing having a center section with a circular cross-section and first and second end walls at the opposite ends of and cooperating with said center section to form a closed container; means at one end of said container for introducing solids to be comminuted thereinto; means at the opposite end of said container through which comminuted solids can be discharged therefrom, said discharge means having an inlet communicating with the interior of said container; screen means overlying said inlet to keep grinding balls disposed in said container from being discharged therefrom with the comminuted solids; and means for stirring a mass of grinding balls disposed in said container and for so circulating said balls into contact with said screen means as to cause said balls to scour said screen means and thereby keep it from becoming plugged with the solids in said container, said stirring means comprising: a shaft housed in and extending from end-to-end of said container and through said first and second end walls, bearings on the exterior sides of said first and second end walls for rotatably supporting said shaft means at the opposite ends thereof for rotation in said container, and a radially extending support rotatable with said shaft and located at the discharge end of the mill; there being an opening in the second end wall, said mill further including an end plate rotatable with said shaft in said opening, and said screen means being concentric with the axis of rotation of the shaft and being supported at its opposite ends from said radially extending support and said end plate.

7. A stirred ball mill as defined in claim 6 in which said stirring means also includes an array of stirring rods surrounding said shaft and fixed to said radially extending support, said rods concentrically overlying said screen and extending from said radially extending support to said second end wall.

8. A stirred ball mill as defined in claim 6 wherein the means for stirring and circulating said grinding balls as aforesaid further comprises a complementary, concentric array of stirring rods supported from the second end wall, the stirring rods in said second array of stirring rods being concentrically arranged with respect to the stirring rods in the first array and the rods in the second array extending from said second end wall to said radially extending support.

9. A stirred ball mill comprising: an elongated casing having a center section with a circular cross-section and end walls at the opposite ends of and cooperating with said center section to form a closed container; means at one end of said container for introducing solids to be comminuted thereinto; means at the opposite end of said container through which comminuted solids can be discharged therefrom, said discharge means having an inlet communicating with the interior of said container; screen means overlying said inlet to keep grinding balls disposed in said container from being discharged therefrom with the comminuted solids; and means for stirring a mass of grinding balls disposed in said container and for so circulating said balls into contact with said screen means as to cause said balls to scour said screen means and thereby keep it from becoming plugged with the solids in said container; said stirred ball mill also having a shaft housed in and extending from end-to-end of said container; the means for stirring and circulating said grinding balls comprising a radially extending support rotatable with said shaft and located at the discharge end of the mill and an array of stirring rods surrounding said shaft and fixed to said support; said discharge means being formed in said shaft and said inlet opening onto the exterior surface of the shaft; there being an opening through that casing end wall at the discharge end of the mill, said opening being circular and concentric with the axis of rotation of said shaft; there being a complementary, circular end plate disposed in said opening and fixed to said shaft for rotation therewith; and said screen means having a cylindrical configuration, surrounding said shaft, and extending between and being fixed at the opposite ends thereof to said end plate and the radially extending, shaft-associated, stirring rod support nearest the discharge end of the mill.

10. A method of operating a stirred ball mill which has a casing with an inlet and an outlet at opposite ends thereof and stirring means which can be revolved about the longitudinal axis of said casing, said method including the steps of:

a. charging said mill with grinding balls and material to be comminuted,
b. revolving said stirring means about said longitudinal axis to stir said balls and thereby produce comminution-promoting contact between said balls and the material being comminuted, and
c. so adjusting the elevation of said outlet end of said casing with respect to the inlet end thereof while said material is being comminuted as to promote an even distribution of said grinding balls over the length of that space in said casing in which grinding occurs and thereby reduce the power required to operate said mill.

11. A method of operating a stirred ball mill as defined in claim 10 which includes the step of so changing the angle of inclination of said casing while said ball mill is operating and concomitantly with a change in the throughput of the material being comminuted as to promote an even distribution of the grinding balls as aforesaid.

12. A method of operating a stirred ball mill which has a casing with an inlet and an outlet at opposite ends thereof and stirring means which can be revolved about the longitudinal axis of said casing, said method including:

a. charging said mill with grinding balls and material to be comminuted, b. revolving said stirring means about said longitudinal axis to stir said balls and thereby produce comminution-promoting contact between said balls and the material being comminuted, and c. so adjusting the elevation of said outlet end of said casing with respect to the inlet end thereof while said material is being comminuted that the angle of inclination of said casing is matched to the pseudo angle of repose of the grinding balls with which the mill is charged, thereby promoting an even distribution of said grinding balls over the length of that space in said casing in which grinding occurs.

13. A stirred ball mill comprising: a rotatable, elongated casing which has a central section with a circular cross-section and end walls at the opposite ends of and cooperating with said casing central section to form a closed container; a rotatable shaft housed in said container in concentricity therewith, said shaft extending from end-to-end of said container; means for stirring a mass of grinding balls disposed in said container, said ball stirring means comprising: radially extending supports at intervals along and rotatable with said shaft, circular arrays of rods extending between and fixed to said shaft-associated supports with the longitudinal axes of the rods paralleling the axis of rotation of said shaft, supports extending radially inward from said casing at locations between those occupied by said shaft-associated supports, and circular arrays of rods fixed to said casing-associated supports with the rods in each casing-associated array being in concentric relationship with the rods in one of the arrays of rods fixed to a shaft-associated support; and means for rotating said shaft and said casing in opposite directions.

14. A stirred type ball mill as defined in claim 13 which includes: means so surrounding said shaft at the discharge end of said mill as to keep grinding balls disposed in said container from entering said discharge passage means and thereby being discharged from said ball mill with solids comminuted in said mill.

15. A stirred ball mill as defined in claim 14 wherein the means surrounding said shaft to keep grinding balls from being discharged from said mill comprises a screen extending between that pair of circular supports nearest the discharge end of the ball mill.

16. A stirred ball mill as defined in claim 14 wherein the means surrounding said shaft to keep grinding balls from being discharged from said mill comprises a screen extending between the circular support nearest the discharge end of the mill and the casing end wall at that end of the mill.

17. A stirred ball as defined in claim 13 wherein there are multiple, concentric, circular arrays of rods fixed to each of said shaft-associated supports and to each of said casing-associated supports, the shaft-associated and casing-associated arrays of rods being alternated in a radial direction.

18. A stirred ball mill as defined in claim 13 in which the means for stirring the grinding balls also includes a circular array of rods as aforesaid fixed to and extending inwardly from each of said end walls.

19. A stirred ball mill as defined in claim 13 in which said rods are fixed in cantilevered relationship to said shaft-associated and said casing-associated supports.

20. A stirred ball mill as defined in claim 13 wherein there are two complementary circular arrays of rods fixed to each of said shaft-associated supports and each of said casing-associated supports, the rods in the two complementary arrays being located on opposite sides of and extending in opposite directions from the support to which they are fixed.

21. A stirred ball mill as defined in claim 13 wherein said casing center section and end walls, said shaft, and said shaft- and casing-associated supports define a series of grinding compartments and wherein there are, in each of said compartments, at least one shaft-surrounding array of stirring rods which are fixed to a shaft-associated support defining that compartment and at least one complementary array of rods fixed to a casing-associated support defining said compartment.

22. A stirred ball mill as defined in claim 21 wherein all of the stirring rods in each of said compartments parallel the axis of rotation of the shaft.

23. A stirred ball mill as defined in claim 13 wherein said casing center section, said casing end walls, said shaft, and the shaft- and casing-associated supports define a series of grinding compartments and wherein there are, in each of said compartments, multiple, concentric, shaft-associated arrays of rods and, associated and alternated therewith, arrays of rods which are supported from a casing-associated support or one of said casing end walls.

24. A stirred ball mill as defined in claim 13 in which both the shaft-associated and casing-associated supports have a circular configuration with the shaft-associated supports extending from said shaft toward said casing and the casing-associated supports extending from said casing toward said shaft; wherein said shaft- and casing-associated supports, said shaft, said casing center section, and said casing end walls define a series of grinding compartments; and wherein there are gaps between said shaft-associated supports and said casing and between said casing-associated supports and said shaft which allow solids being comminuted in the mill to flow from one to the next of said compartments.

25. A method of operating a stirred ball mill which has a casing with stirring means supported therefrom and complementary, shaft-supported stirring means which can be revolved about the longitudinal axis of said casing, said method including the steps of:

a. charging said mill with grinding balls and material to be comminuted, b. revolving said shaft-supported stirring means about said longitudinal axis to stir said balls and thereby produce comminution-promoting contact between said balls and the material being comminuted, and c. promoting uniformity in the distribution of the grinding balls in said casing, looking in a radial direction, and consequent efficiency of the comminution effected in said mill by rotating the casing-supported stirring means about said longitudinal axis but in the opposite direction from the direction of rotation of the shaft-supported stirring means.

* * * * *